(12) United States Patent
Teng et al.

(10) Patent No.: US 8,629,853 B2
(45) Date of Patent: Jan. 14, 2014

(54) TOUCH PANEL AND THE TOUCH DISPLAY DEVICE USING THE SAME

(75) Inventors: Chih-Jung Teng, Taichung (TW); Chin-Chang Liu, Taichung County (TW)

(73) Assignees: Wintek Corporation, Taichung (TW); Wintek (China) Technology Ltd., Province Dongguan (CN)

( * ) Notice: Subject to any disclaimer, the term of this patent is extended or adjusted under 35 U.S.C. 154(b) by 159 days.

(21) Appl. No.: 13/233,098

(22) Filed: Sep. 15, 2011

(65) Prior Publication Data

US 2012/0062515 A1  Mar. 15, 2012

(30) Foreign Application Priority Data

Sep. 15, 2010  (TW) .............................. 99131142 A

(51) Int. Cl.
  *G06F 3/045*  (2006.01)
(52) U.S. Cl.
  USPC ......................................................... 345/174
(58) Field of Classification Search
  None
  See application file for complete search history.

(56) References Cited

U.S. PATENT DOCUMENTS

| 8,134,541 B2 * | 3/2012 | Chen et al. ..................... 345/174 |
| 2011/0210936 A1 * | 9/2011 | Wang et al. ..................... 345/174 |

* cited by examiner

*Primary Examiner* — Jason Olson
(74) *Attorney, Agent, or Firm* — WPAT, PC; Justin King

(57) ABSTRACT

A touch panel comprising a substrate, a plurality of first electrodes and a plurality of second electrodes is provided. The first electrodes and the second electrodes are disposed on the substrate in rows and columns. The first electrodes are formed as triangles of a base wherein the corresponding first electrodes aligned in any two neighboring columns are symmetrically arranged in shape based on the base, and the first electrodes aligned in the same row are serially connected by multiple first conductive lines. The second electrodes are formed as triangles of a base, wherein the corresponding second electrodes aligned in any two neighboring columns are symmetrically arranged in shape based on the base, and the second electrodes aligned in the same column are serially connected by multiple second conductive lines. The first conductive lines are arranged crossing over and insulated from the second conductive lines.

15 Claims, 6 Drawing Sheets

TOUCH PANEL AND THE TOUCH DISPLAY DEVICE USING THE SAME

FIELD OF THE INVENTION

The present invention relates to a touch panel and the touch display device using the same, and more particularly, to a capacitive touch panel with its specifically designed triangle-shaped touch electrodes capable of effectively reducing the layout area and the load of driver IC, and increasing the sensitivity, resolution and operation area of the touch panel.

BACKGROUND OF THE INVENTION

Please refer to FIG. 1, which is a schematic diagram showing a conventional capacitive touch panel. In FIG. 1, the capacitive touch panel is constructed as a substrate 15 having a plurality of diamond-shaped X-axis electrodes 11 and a plurality of diamond-shaped Y-axis electrodes 12 that are alternatively disposed on the same surface thereof, in that the X-axis electrodes 11 are arranged in rows and the Y-axis electrodes 12 are arranged in columns. In addition, the X-axis electrodes 11 aligned in the same row are electrically connected by the X-axis conductive wires 13, and the Y-axis electrodes 12 aligned in the same column are electrically connected by the Y-axis conductive wires 14. Moreover, there is an insulation layer disposed on the substrate 15 to prevent the X-axis conductive wires 13 from electrically contacting to the Y-axis conductive wires 14. As shown in FIG. 1, the X-axis conductive wires 13 are represented as the dotted lines that are covered by the insulation layer, whereas the Y-axis conductive wires 14 are set across the insulation layer.

Being restricted by the geometrical limitation, the layout of the diamond-shaped X-axis electrodes 11 and Y-axis electrodes 12 will occupy comparatively larger area on the substrate 15 of the touch panel. As shown in FIG. 1, there are four spaces P for two neighboring X-axis conductive wires 13 two neighboring Y-axis conductive wires 14 respectively. Consequently, since the circuit layout using such diamond-shaped X-axis electrodes 11 and Y-axis electrodes 12 will occupy comparatively larger area, the sensitivity of the resulting touch panel will be conceivably not satisfactory. Therefore, the conventional electrodes and layout are not adapted to the consumer electronics with high touch resolution, like electronic paper, because the above space area is relatively larger when the electrodes are minimized for high touch resolution.

Moreover, the conventional pattern design, diamond-like or hexagon-like electrodes, resulted in the poor resolution is hard to apply to the consumer electronics with writing or drawing requirement for instantly responding the movement of the finger or stylus.

SUMMARY OF THE INVENTION

In view of the disadvantages of prior art, the object of the present invention is to provide a touch panel and the touch display device using the same that is capable of effectively reducing the layout area and the load of driver IC, and increasing the sensitivity, resolution and operation area of the touch panel.

To achieve the above object, the present invention provides a touch panel comprising a substrate, a plurality of first electrodes and a plurality of second electrodes wherein the first electrodes and the second electrodes are disposed on the substrate in rows and columns. The first electrodes are formed as triangles of a base wherein the corresponding first electrodes aligned in any two neighboring columns are symmetrically arranged in shape based on the base, and the first electrodes aligned in the same row are serially connected by multiple first conductive lines. The second electrodes are formed as triangles of a base, wherein the corresponding second electrodes aligned in any two neighboring columns are symmetrically arranged in shape based on the base, and the second electrodes aligned in the same column are serially connected by multiple second conductive lines. The first conductive lines are arranged crossing over and insulated from the second conductive lines.

Moreover, the present invention further provides a touch display device comprising a touch panel and a display disposed thereon. The touch panel comprises a substrate, a plurality of first electrodes and a plurality of second electrodes wherein the first electrodes and the second electrodes are disposed on the substrate in rows and columns. The first electrodes are formed as triangles of a base wherein the corresponding first electrodes aligned in any two neighboring columns are symmetrically arranged in shape based on the base, and the first electrodes aligned in the same row are serially connected by multiple first conductive lines. The second electrodes are formed as triangles of a base, wherein the corresponding second electrodes aligned in any two neighboring columns are symmetrically arranged in shape based on the base, and the second electrodes aligned in the same column are serially connected by multiple second conductive lines. The first conductive lines are arranged crossing over and insulated from the second conductive lines.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 2:
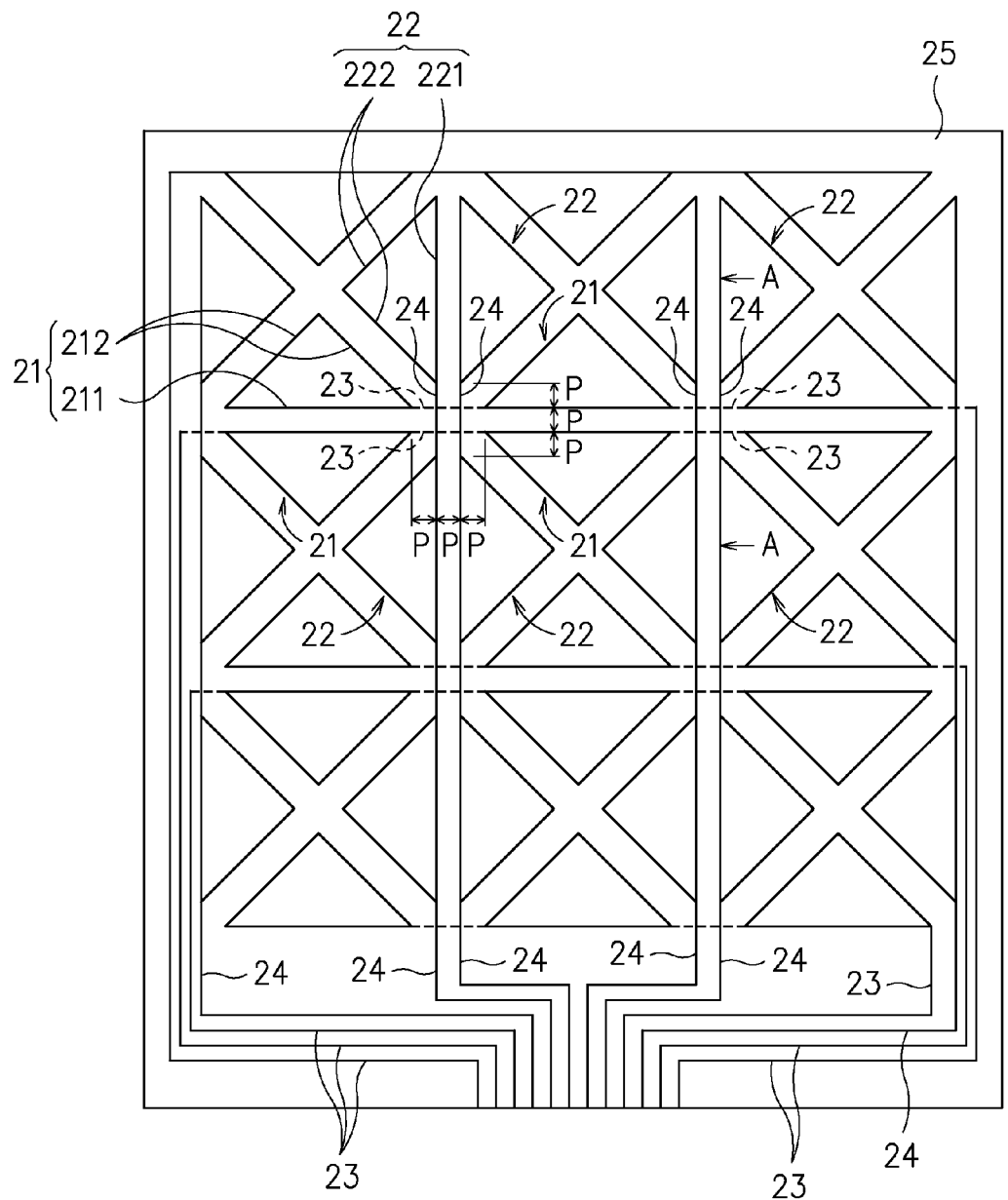
FIG. 2 is a schematic diagram showing a touch panel according to a first embodiment of the invention.

Please refer to FIG. 2, which is a schematic diagram showing a touch panel according to a first embodiment of the invention. As shown in FIG. 2, the touch panel 20 comprises: a substrate 25, a plurality of first electrodes 21 and a plurality of second electrodes 22, in which the first electrodes 21 and the second electrodes 22 are formed of the same shape and size and disposed on the substrate 25.

In FIG. 2, the plural first electrodes 21 are arranged in rows wherein each first electrode 21 is formed in a shape of an isosceles triangle having two equal sides 212 and a base 211. In addition, the corresponding first electrodes 21 that are aligned in any two neighboring rows are symmetrically arranged in shape; and the first electrodes 21 aligned in the same row are serially connected by the first conductive lines 23 parallel to the bases 211 of the first electrodes 21 and extending to the rims of the substrate 25.

Similarly, the second electrodes 22 are arranged in columns wherein each second electrode 22 is formed in a shape of an isosceles triangle having two equal sides 222 and a base 221. In addition, the corresponding second electrodes 22 that are aligned in any two neighboring columns are symmetrically arranged in shape; and the second electrodes 22 aligned in the same column are serially connected by the second conductive lines 24 parallel to the corresponding bases 221 of the second electrodes 22 and extending to the rims of the substrate 25.

By the geometrical characteristic of the triangle, the first electrodes 21 in rows and the second electrodes 22 in columns are arranged symmetrically in shape based on the bases 211 and the bases 221 respectively such that the corresponding first electrodes 21 of the neighboring rows face to each other and the corresponding second electrodes 22 of the neighboring columns face to each other. In addition, the first conductive lines 23 connecting the first electrodes 21 are arranged crossing over and insulated from the second conductive lines 24 connecting the second electrodes 22.

In the embodiment shown in FIG. 2, the array of the first electrodes 21 is composed of six rows wherein each row is composed of three first electrodes 21 that are serially connected with each other by the first conductive line 23, and the array of the second electrodes 22 is composed of six columns wherein each column is composed of three second electrodes 22 that are serially connected with each other by the second conductive line 24. Moreover, there is an insulation layer formed between the first conductive lines 23 and the second conductive lines 24 to prevent from short therebetween.

Compared with the conventional layout with four spaces P for two neighboring conductive wires, there are only three spaces P for two neighboring first conductive lines 23 or two neighboring second conductive lines 24 because of one common space. Accordingly, the space area can be reduced for containing more first electrodes 21 and the second electrodes 22 to raise the sensitivity when the pattern area of each first electrode 21 or each second electrode 22 is equal to that of each conventional diamond-shaped electrode. Moreover, for any two neighboring rows of the first electrodes 21, the first electrodes 21 aligned in one of the two rows are designated to be driver electrodes, and the first electrodes 21 aligned in another row are designated to be sensor electrodes; for any two neighboring columns of the second electrodes 22, the second electrodes 22 aligned in one of the two columns are designated to be driver electrodes, and the second electrodes 22 aligned in another column are designated to be sensor electrodes. Thus, any driver electrode and its neighbor sensor electrode will face each other by their relatively longer bases 211/221, and the sensing sensitivity of the touch panel is enhanced.

Figure 3:
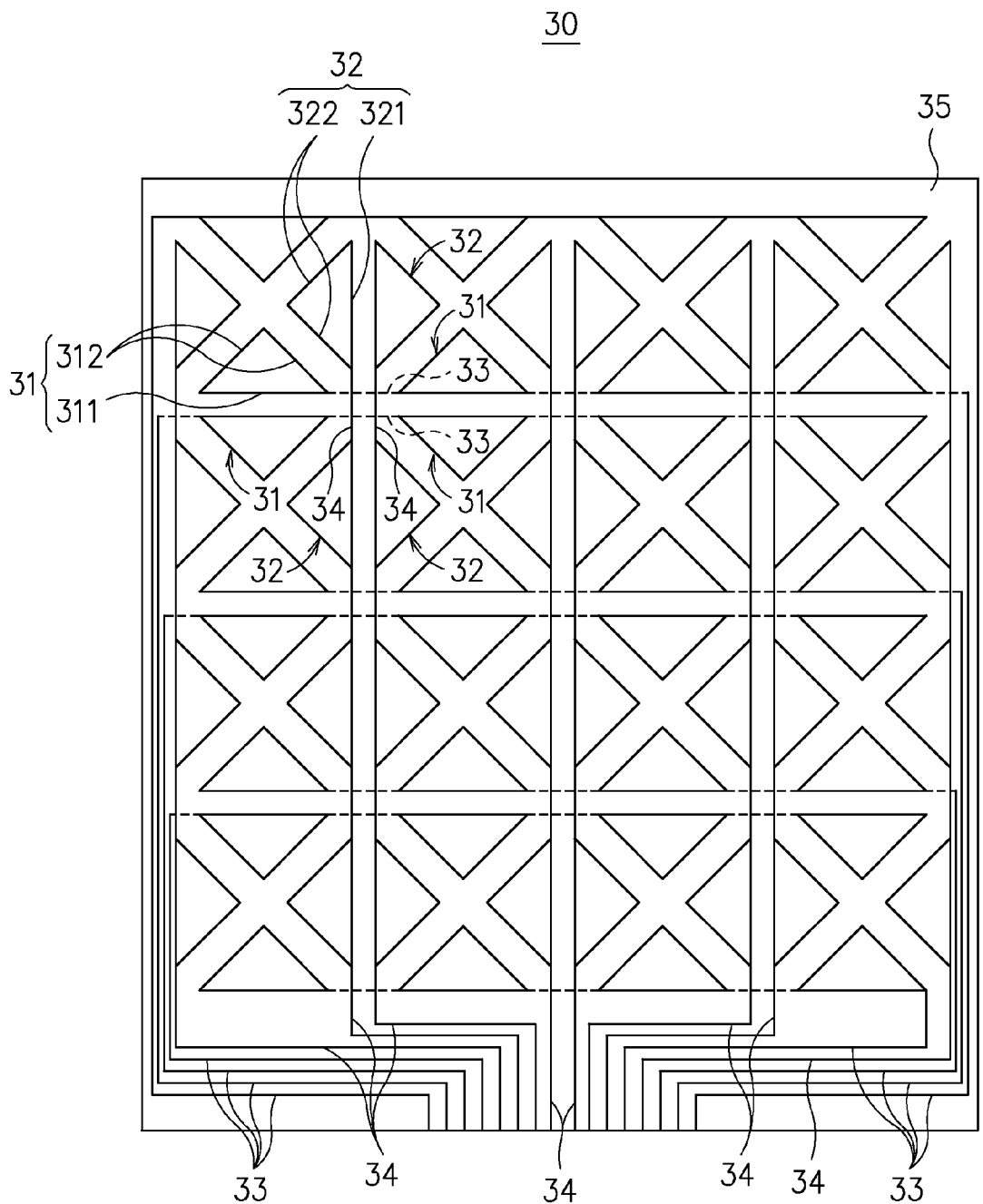
FIG. 3 is a schematic diagram showing a touch panel according to a second embodiment of the invention.

Please refer to FIG. 3, which is a schematic diagram showing a touch panel according to a second embodiment of the invention. In this embodiment, the touch panel 30 comprises: a substrate 35; a plurality of first electrodes 31, disposed on the substrate 35 in rows; and a plurality of second electrodes 32, disposed on the substrate 35 in columns. Each of the first electrodes 31 or the second electrodes 32 is formed as an isosceles triangle having two equal sides 312/322 and a base 311/321. The first electrodes 31 aligned in any two neighboring rows are symmetrically arranged in shape, and the first electrodes 31 aligned in the same row are serially connected by the first conductive lines 33. The second electrodes 32 aligned in any two neighboring columns are symmetrically arranged in shape, and the second electrodes 32 aligned in the same column are serially connected by the second conductive lines 34. Therefore, the first electrodes 31 in rows and the second electrodes 32 in columns are arranged symmetrically in shape based on the bases 311 and the bases 321 respectively such that the corresponding first electrodes 31 of the neighboring rows face to each other and the corresponding second electrodes 32 of the neighboring columns face to each other. In addition, the first conductive lines 33 connecting the first electrodes 31 are arranged crossing over and insulated from the second conductive lines 34 connecting the second electrodes 32.

Figure 1:
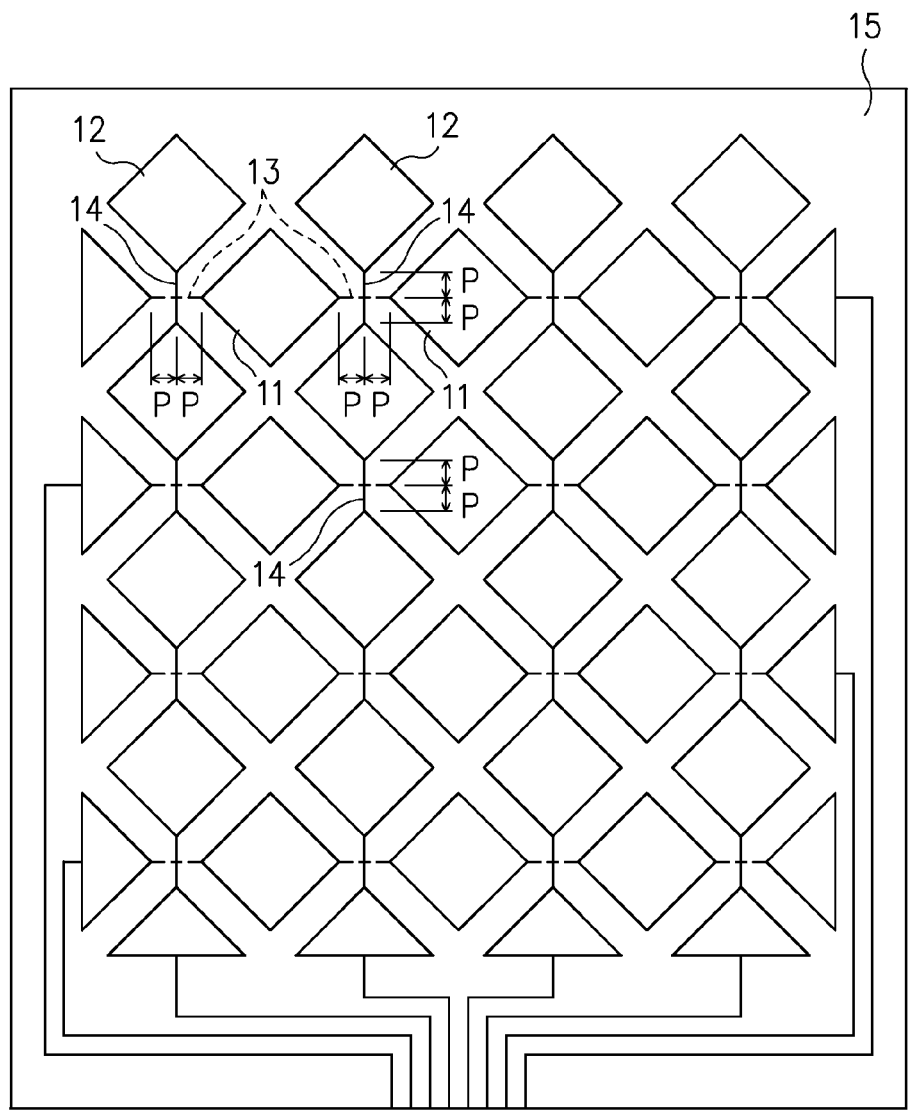
FIG. 1 is a schematic diagram showing a conventional capacitive touch panel.

Moreover, in this embodiment, the area of each first electrode 31 or each second electrodes 32 is half of the area of the conventional diamond-shaped electrode shown in FIG. 1. That is, the total area of two triangle-shaped first electrodes 31 whose bases 311 are orientated facing toward each other is equal to that of one conventional diamond-shaped electrode of FIG. 1; the total area of two triangle-shaped second electrodes 32 whose bases 321 are orientated facing toward each other is equal to that of one conventional diamond-shaped electrode of FIG. 1. Although the amount of the first electrode 31, the second electrode 32, the first conductive line 33 and the second conductive line 34 will be increased in comparison to the touch panel 20 of the same area as shown in the first embodiment of FIG. 2, the resolution of the touch panel 30 of the second embodiment is increased.

Figure 4:
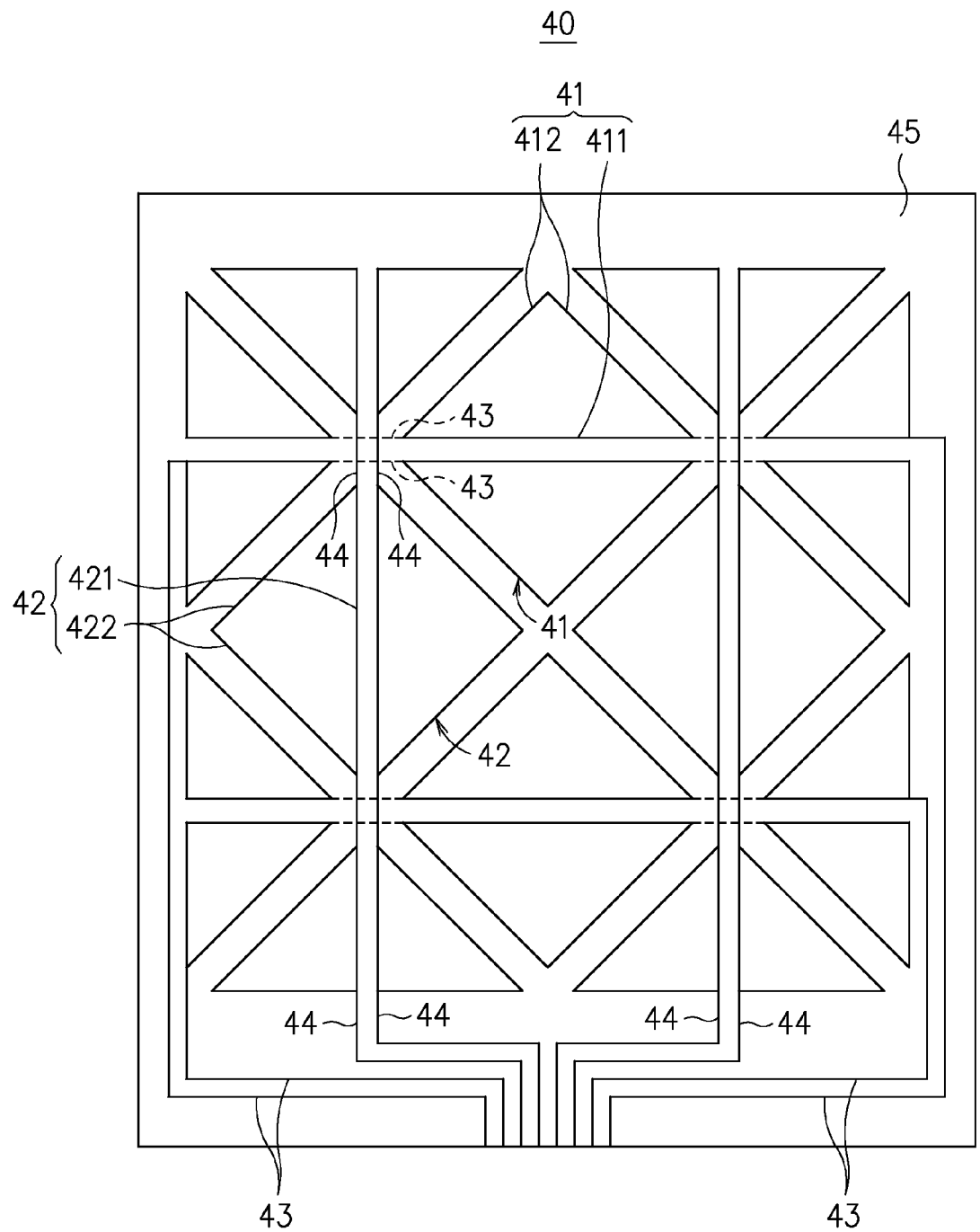
FIG. 4 is a schematic diagram showing a touch panel according to a third embodiment of the invention.

Please refer to FIG. 4, which is a schematic diagram showing a touch panel according to a third embodiment of the invention. In this embodiment, the touch panel 40 comprises: a substrate 45; a plurality of first electrodes 41, disposed on the substrate 45 in rows; and a plurality of second electrodes 42, disposed on the substrate 45 in columns. Each of the first electrodes 41 or the second electrodes 42 is formed as an isosceles triangle having two equal sides 412/422 and a base 411/421. The first electrodes 41 aligned in any two neighboring rows are symmetrically arranged in shape, and the first electrodes 41 aligned in the same row are serially connected by the first conductive lines 43. The second electrodes 42 aligned in any two neighboring columns are symmetrically arranged in shape, and the second electrodes 42 aligned in the same column are serially connected by the second conductive lines 44. Therefore, the first electrodes 41 in rows and the second electrodes 42 in columns are arranged symmetrically in shape based on the bases 411 and the bases 421 respectively such that the corresponding first electrodes 41 of the neighboring rows face to each other and the corresponding second electrodes 42 of the neighboring columns face to each other. In addition, the first conductive lines 43 connecting the first electrodes 41 are arranged crossing over and insulated from the second conductive lines 44 connecting the second electrodes 42.

In addition to the benefit of reducing space area and increasing sensitivity, the sensing area of the touch panel 40 of the present embodiment is increased through enlarging the area of each first electrode 41 and each second electrode 42 based on the same number of electrodes and conductive lines of the conventional touch panel 10 of FIG. 1.

Although the first electrodes 21, 31, 41 and the second electrodes 22, 32, 42 shown in FIG. 2 to FIG. 4 are all formed as right angled isosceles triangles, but they are not limited thereby and thus can be formed in shapes of other triangles depending on the requirement. It is noted that the major characteristic of the touch panel in the present invention is the triangle-shaped electrodes that can be adapted for various touch panels. Please refer to FIG. 5 to FIG. 9, which are sectional views of different embodiments of the first electrodes 21 and second electrodes 22 along the A-A cross section line in FIG. 2.

Figure 5:
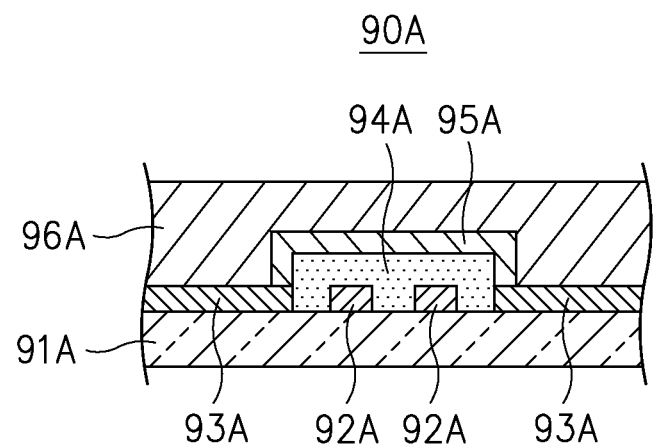
FIG. 5 to FIG. 8 are cross sectional views of different touch panels according to the present invention.

As the cross section shown in FIG. 5, the touch panel 90A comprises: a substrate 91A having two conductive lines 92A and two Y-axis electrodes 93A disposed thereon; an insulation layer 94A formed on the conductive lines 92A; a metal wire 95A formed on the insulation layer 94A for electrically connecting the two Y-axis electrodes 93A; and a protective layer 96A formed on the Y-axis electrodes 93A and the metal wire 95A. In FIG. 5, the conductive line 92A are substantially equivalent to the first conductive line 23 of FIG. 2, the Y-axis electrodes 93A are substantially equivalent to the second electrode 22 of FIG. 2, and the metal wire 95A are substantially equivalent to the second conductive line 24 of FIG. 2. Thus, the insulation layer 94A on the conductive lines 92A can be used for preventing from the short circuit between the conductive lines 92A and the Y-axis electrodes 93A.

Figure 6:
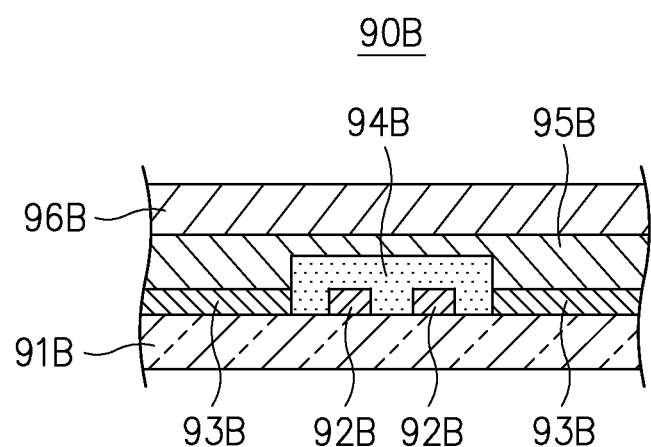

As the cross section shown in FIG. 6, the touch panel 90B comprises: a substrate 91B having two conductive lines 92B and two Y-axis electrodes 93B disposed thereon; an insulation layer 94B formed on the conductive lines 92B completely and the Y-axis electrodes 93B partially; a metal layer 95B formed on the insulation layer 94B for electrically connecting the two Y-axis electrodes 93A that are not covered by the insulation layer 94B; and a protective layer 96B formed on the metal layer 95B.

Figure 7:
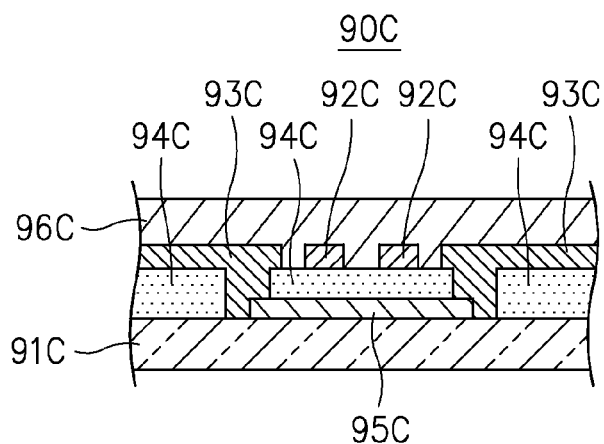

As the cross section shown in FIG. 7, the touch panel 90C comprises: a substrate 91C having a metal layer 95C disposed thereon; an insulation layer 94C formed on the substrate 91C and the metal layer 95C to expose the two sides of the metal layer 95C; two conductive lines 92C formed on the insulation layer 94C corresponding to the metal layer 95C; two Y-axis electrodes 93C formed on the insulation layer 94C to electrically connect to each other through the metal layer 95C; and a protective layer 96C formed on the conductive lines 92C and the Y-axis electrodes 93C.

Figure 8:
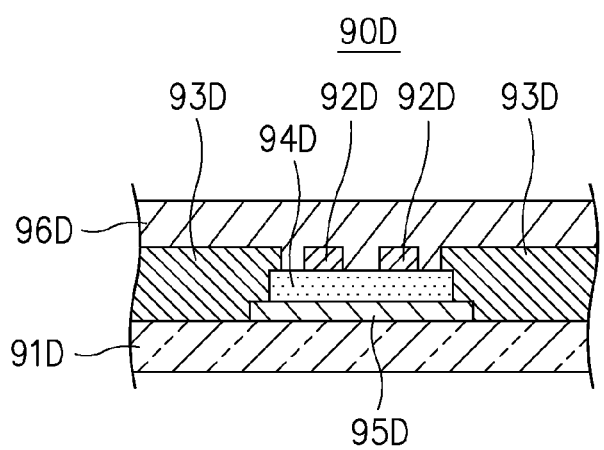

As the cross section shown in FIG. 8, the touch panel 90D comprises: a substrate 91D having a metal layer 95D disposed thereon; an insulation layer 94D formed on the metal layer 95D to expose the two sides of the metal layer 95D; two conductive lines 92D formed on the insulation layer 94D corresponding to the metal layer 95D; two Y-axis electrodes 93D formed on the substrate 91D to electrically connect to each other through the metal layer 95D; and a protective layer 96D formed on the conductive lines 92D and the Y-axis electrodes 93D.

It is noted that the substrates 91A~91D used in FIG. 5 to FIG. 8 can be a transparent glass, a color filter, a cover lens, a plastic substrate or a polarizer.

Figure 9:
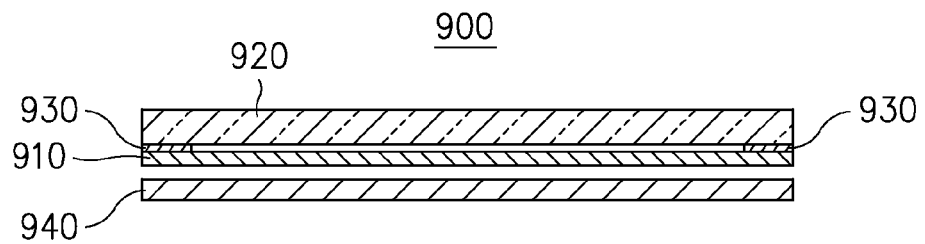
FIG. 9 is a schematic diagram showing a touch display device according to the present invention.

Please refer to FIG. 9, which is a schematic diagram showing a touch display device according to the present invention. The touch display device 900 of FIG. 9 is substantially a laminated structure consisting of: a cover lens 920 having a decorative layer 930 disposed on the circumference thereof, a touch unit 910, and a display 940 disposed on the touch unit 910. It is noted that the touch unit 910 can be the touch panels 20, 30, 40 with triangle-shaped electrodes that are disclosed in the embodiments of FIG. 2 to FIG. 4. Moreover, the display 940 can be a liquid crystal display (LCD), an organic light-emitting display (OLED), an electro-wetting display (EWD), or an electrophoretic display (EPD).

To sum up, the touch panel with triangle-shaped electrodes provided by the present invention is capable of effectively reducing the layout area required, increasing the sensitivity of the touch panel and the resolution thereof as well, enabling the load to driver IC to be reduced, and enabling the operation area of the touch panel to be increased.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A touch panel, comprising:
   a substrate;
   a plurality of first electrodes, disposed on the substrate in rows and formed as triangles, wherein each row of the first electrodes is symmetrical to a neighboring row of the first electrodes, and the first electrodes in a same row are serially connected by a plurality of first conductive lines; and
   a plurality of second electrodes, disposed on the substrate in columns and formed as triangles, wherein each column of the second electrodes is symmetrical to a neighboring column of the second electrodes, and the second electrodes in a same column are serially connected by a plurality of second conductive lines;
   wherein the plurality of first conductive lines are arranged crossing over and insulated from the plurality of second conductive lines.

2. The touch panel of claim 1, wherein each first electrode is formed as an isosceles triangle and each second electrode is formed as an isosceles triangle.

3. The touch panel of claim 2, wherein the first conductive lines are connected to the first electrodes at the vertices of the bases of the first electrodes and the second conductive lines are connected to the second electrodes at the vertices of the bases of the second electrodes.

4. The touch panel of claim 3, wherein the first conductive lines are parallel to the bases of the first electrodes and the second conductive lines are parallel to the bases of the second electrodes.

5. The touch panel of claim 1, wherein the first electrodes and the second electrodes are formed of the same shape and size.

6. The touch panel of claim 1,
   wherein the first electrodes in one of the two neighboring rows are designated to be driver electrodes, and the first electrodes in the other row are designated to be sensor electrodes; and
   wherein the second electrodes in one of the two neighboring columns are designated to be driver electrodes, and the second electrodes in the other column are designated to be sensor electrodes.

7. The touch panel of claim 1, wherein the substrate is a transparent glass, a color filter, a cover lens, a plastic substrate or a polarizer.

8. A touch display device, comprising:
a touch panel, further comprising:
   a substrate;
   a plurality of first electrodes, disposed on the substrate in rows and formed as triangles, wherein each row of the first electrodes is symmetrical to a neighboring row of the first electrodes, and the first electrodes in a same row are serially connected by a plurality of first conductive lines; and
   a plurality of second electrodes, disposed on the substrate in columns and formed as triangles, wherein each column of the second electrodes is symmetrical to a neighboring column of the second electrodes, and the second electrodes in a same column are serially connected by a plurality of second conductive lines; and
a display, disposed on the touch panel;
wherein the plurality of first conductive lines are arranged crossing over and insulated from the plurality of second conductive lines.

9. The touch display device of claim 8, wherein the substrate is a cover lens having a decorative layer disposed on the circumference thereof.

10. The touch display device of claim 8, wherein the display is a liquid crystal display (LCD), an organic light-emitting display (OLED), an electro-wetting display (EWD), or an electrophoretic display (EPD).

11. The touch display device of claim 8, wherein each first electrode is formed as an isosceles triangle and each second electrode is formed as an isosceles triangle.

12. The touch display device of claim 9, wherein the first conductive lines are connected to the first electrodes at the vertices of the bases of the first electrodes and the second conductive lines are connected to the second electrodes at the vertices of the bases of the second electrodes.

13. The touch display device of claim 12, wherein the first conductive lines are parallel to the bases of the first electrodes and the second conductive lines are parallel to the bases of the second electrodes.

14. The touch display device of claim 8, wherein the first electrodes and the second electrodes are formed of the same shape and size.

15. The touch display device of claim 8,
wherein the first electrodes in one of the two neighboring rows are designated to be driver electrodes, and the first electrodes in the other row are designated to be sensor electrodes; and
wherein the second electrodes in one of the two neighboring columns are designated to be driver electrodes, and the second electrodes in the other column are designated to be sensor electrodes.

* * * * *